US009065311B2

(12) United States Patent
Chang et al.

(10) Patent No.: US 9,065,311 B2
(45) Date of Patent: Jun. 23, 2015

(54) LINEAR MOTOR COOLING MECHANISM

(71) Applicant: HIWIN MIKROSYSTEM CORP., Taichung (TW)

(72) Inventors: Yu-Jung Chang, Taichung (TW); Bo-Sheng Huang, Taichung (TW); Chih-Kai Fan, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 193 days.

(21) Appl. No.: 13/672,879

(22) Filed: Nov. 9, 2012

(65) Prior Publication Data

US 2014/0103749 A1    Apr. 17, 2014

(30) Foreign Application Priority Data

Oct. 11, 2012  (TW) .............................. 101137397 A

(51) Int. Cl.
*H02K 1/20* (2006.01)
*H02K 5/20* (2006.01)
*H02K 41/03* (2006.01)
*H02K 9/00* (2006.01)

(52) U.S. Cl.
CPC ................ *H02K 5/20* (2013.01); *H02K 41/031* (2013.01); *H02K 1/20* (2013.01); *H02K 9/00* (2013.01)

(58) Field of Classification Search
CPC .................................. H02K 1/20; H02K 5/20
USPC .................................. 310/12.29, 58, 59, 60 A
See application file for complete search history.

(56) References Cited

U.S. PATENT DOCUMENTS

| 3,634,705 | A  | * | 1/1972  | Fidei ................................ 310/57 |
| 6,323,567 | B1 | * | 11/2001 | Hazelton et al. ........... 310/12.29 |
| 6,469,406 | B1 | * | 10/2002 | Hwang et al. ............... 310/12.29 |
| 6,731,029 | B2 | * | 5/2004  | Shikayama et al. ............ 310/58 |
| 7,235,902 | B2 | * | 6/2007  | Desailly et al. ............. 310/12.29 |

* cited by examiner

*Primary Examiner* — Terrance Kenerly
(74) *Attorney, Agent, or Firm* — Guice Patents PLLC

(57) ABSTRACT

A linear motor cooling mechanism includes two cooling sections. Each cooling section is composed of multiple bypass heads, which are serially connected with each other. The cooling sections are additionally fixedly disposed on the linear motor. Each cooling section has a main flow way and multiple bypass flow ways in communication with the main flow way. External air is guided through the main flow way and distributed to the bypass flow ways so as to controllably flow toward the position of the mover of the linear motor for achieving an air-cooling heat dissipation effect.

5 Claims, 6 Drawing Sheets

LINEAR MOTOR COOLING MECHANISM

BACKGROUND OF THE INVENTION

1. Field of the Invention

The present invention relates generally to a linear motor, and more particularly to a linear motor cooling mechanism.

2. Description of the Related Art

Please refer to FIG. 1. U.S. Pat. No. 6,469,406 discloses a linear motor cooling device. Two lateral substrates 2 of the stator 1 are respectively drilled with main passages 3 for air to flow through. The inner sides of the two substrates 2 are further formed with multiple air outlets 4 in communication with the main passages 3. Accordingly, an external air source can transfer air through the main passage 3 to distribute the air the air outlets 4. In this case, airflow will flow between the substrates 2 to carry away the heat generated by the windings of the mover 5 moving between the substrates 2 and achieve a cooling effect.

The number and position of the air outlets 4 are variable to achieve heat dissipation effect by means of the airflow flowing between the stator 1 and the mover 5. However, it is necessary to drill holes on the substrates 2 of the stator to form the airflow passage. Such process is troublesome so that the manufacturing cost is quite high. Moreover, the substrates 2 of the stator have a limited thickness so that the diameters of both the main passage 3 and the air outlets 4 are limited. As a result, the heat dissipation effect achieved by the conventional technique is limited.

SUMMARY OF THE INVENTION

It is therefore a primary object of the present invention to provide a linear motor cooling mechanism including two cooling sections. Each cooling section is composed of multiple bypass heads, which are serially connected with each other. The cooling section is attached to one side of the stator of the linear motor for guiding external air to flow through the bypass heads in a predetermined direction.

To achieve the above and other objects, the linear motor cooling mechanism of the present invention includes: at least one elongated stator having an elongated bed section and multiple magnetic sections sequentially arranged along a length of the bed section and fixedly disposed on the bed section; a mover positioned in adjacency to one side of the bed section, under the action of magnetic fields created by the adjacent magnetic sections, the mover being reciprocally movable along the length of the bed section; and at least one cooling section having at least one main flow way and multiple bypass flow ways in communication with the main flow way, whereby the air flowing within the main flow way can be distributed to the respective bypass flow ways to flow out from the bypass flow ways so as to form airflow between the stator and the mover. The linear motor cooling mechanism is characterized in that the cooling section has multiple bypass heads serially connected with each other. The bypass heads are fixedly disposed on one side of the stator along the length thereof. The main flow way extends along an axis of the serially connected bypass heads in communication with the bypass flow ways. Each bypass flow way is formed in a corresponding bypass head in communication with the main flow way to form an air outlet on one side of the bypass head.

The present invention can be best understood through the following description and accompanying drawings, wherein:

DETAILED DESCRIPTION OF THE PREFERRED EMBODIMENTS

Figure 1:
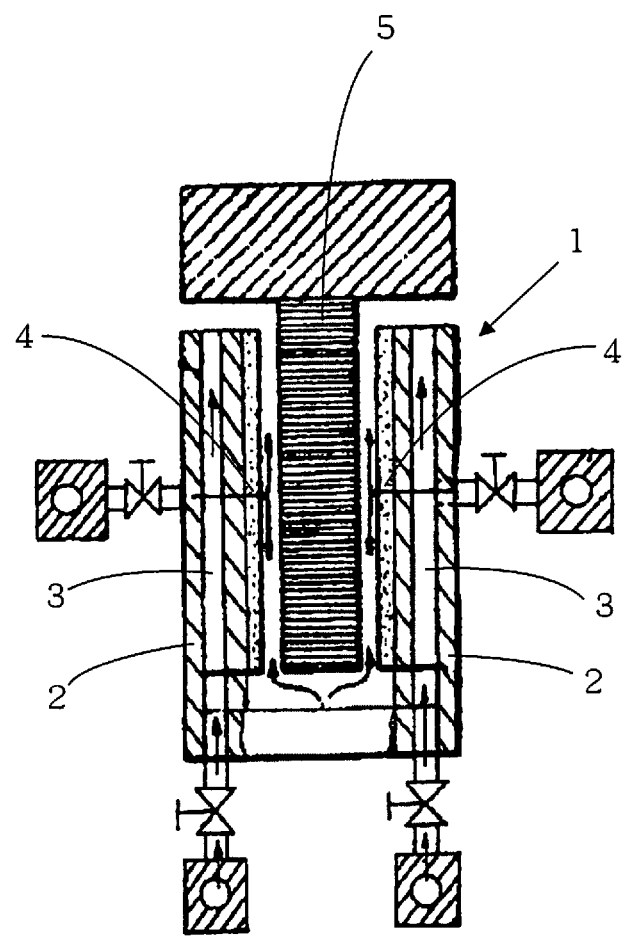
FIG. 1 is a sectional view of a conventional linear motor cooling device.
Figure 2:
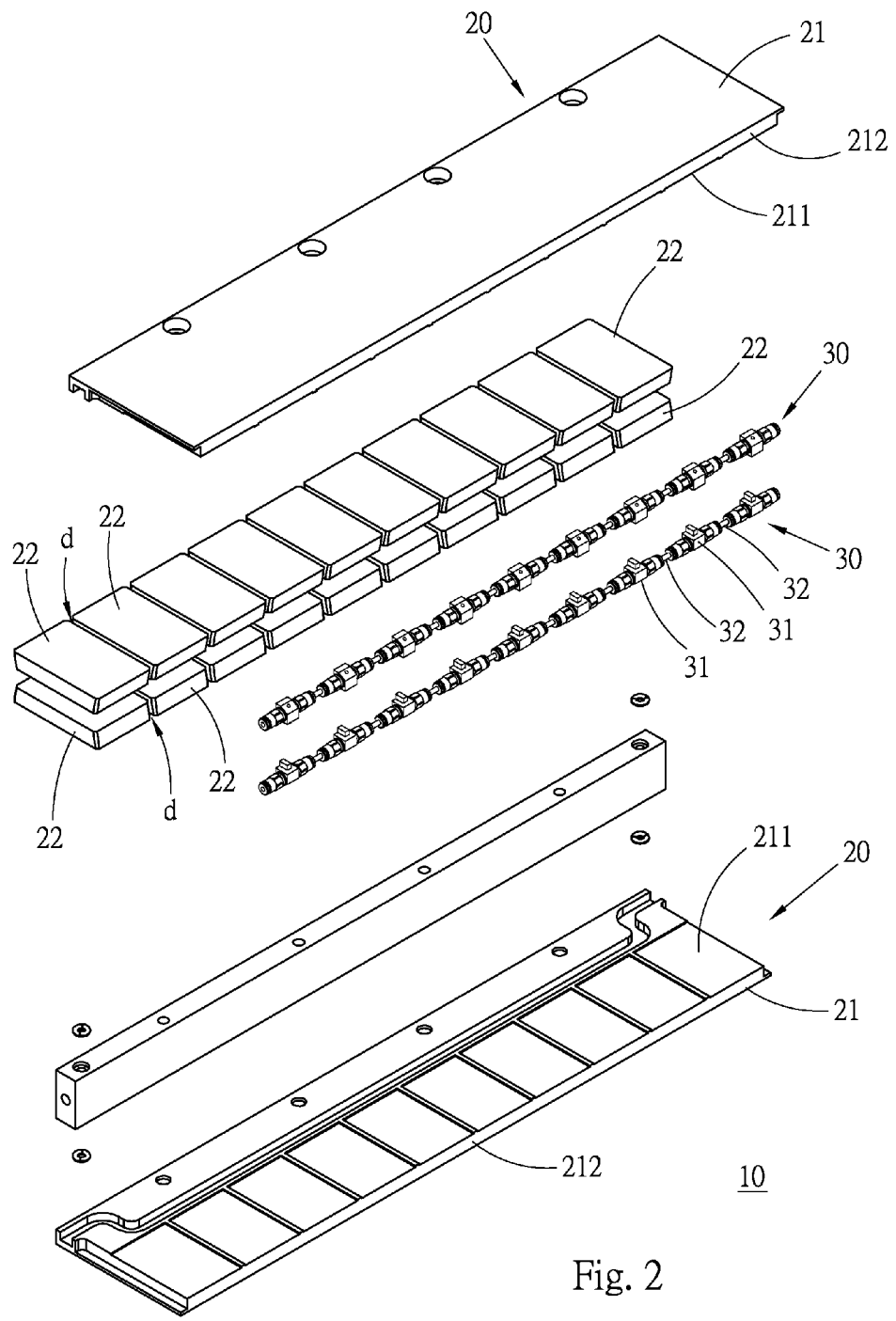
FIG. 2 is a perspective exploded view of a preferred embodiment of the present invention.
Figure 3:
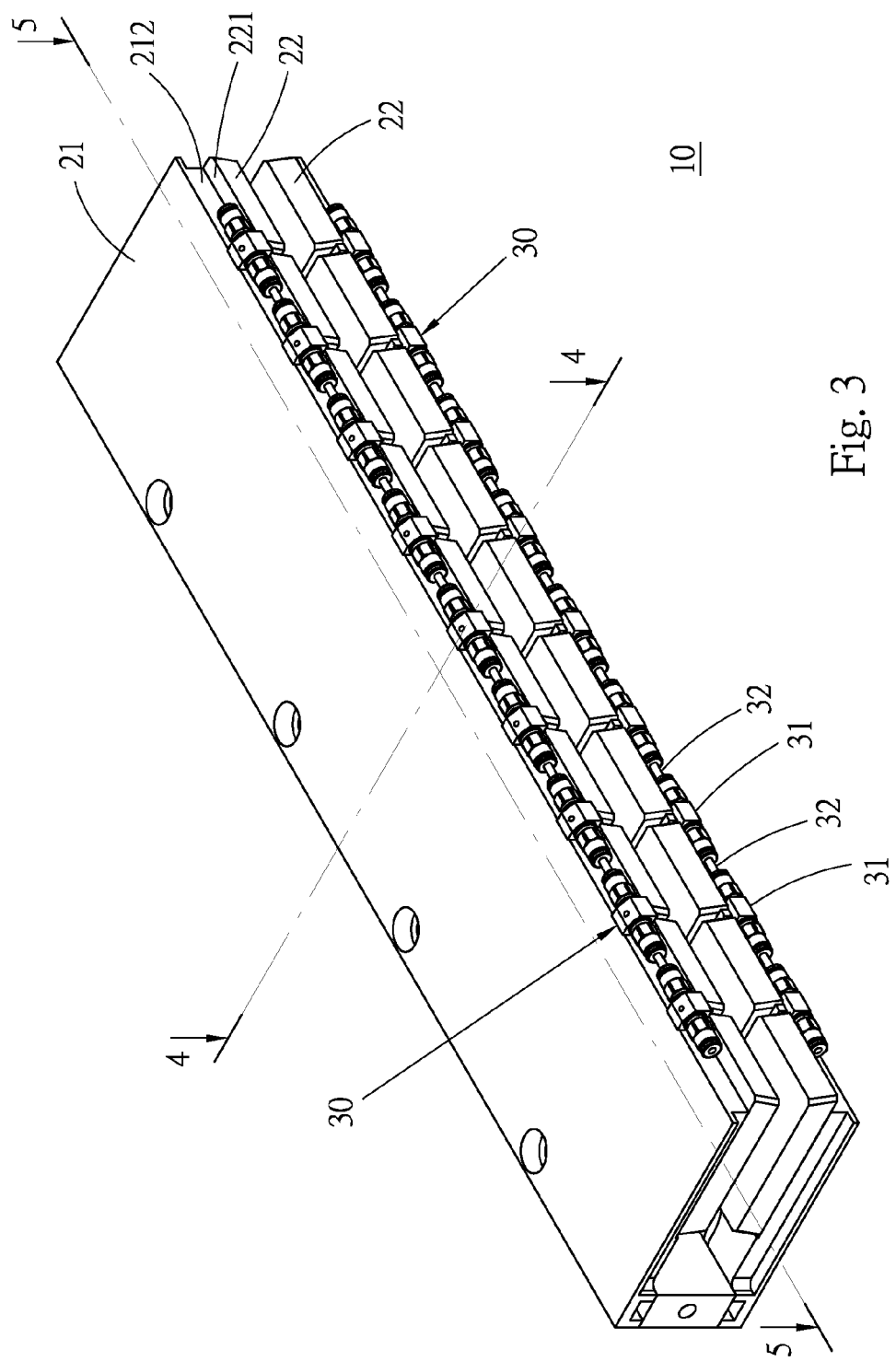
FIG. 3 is a perspective assembled view of the preferred embodiment of the present invention.
Figure 4:
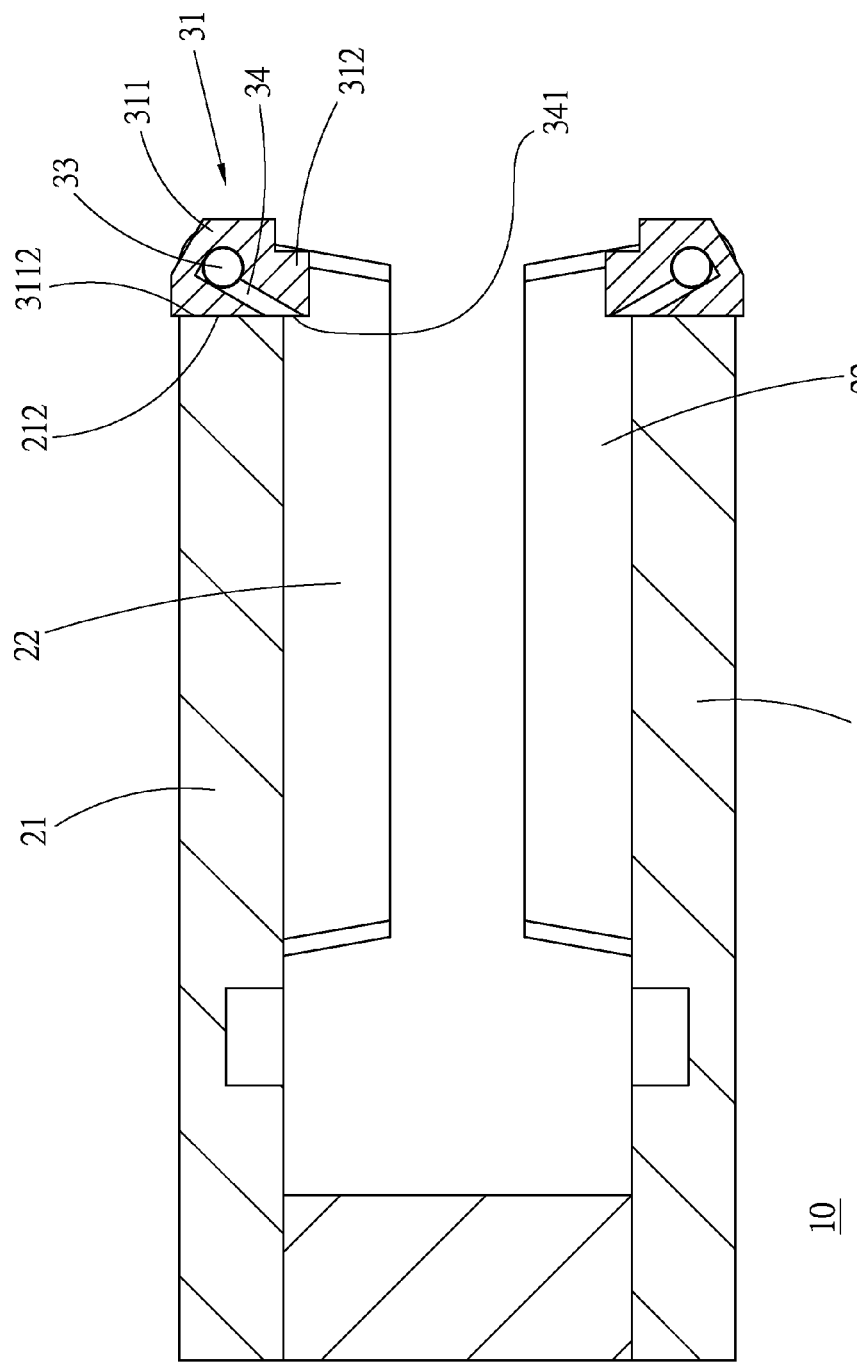
FIG. 4 is a sectional view taken along line 4-4 of FIG. 3.
Figure 5:
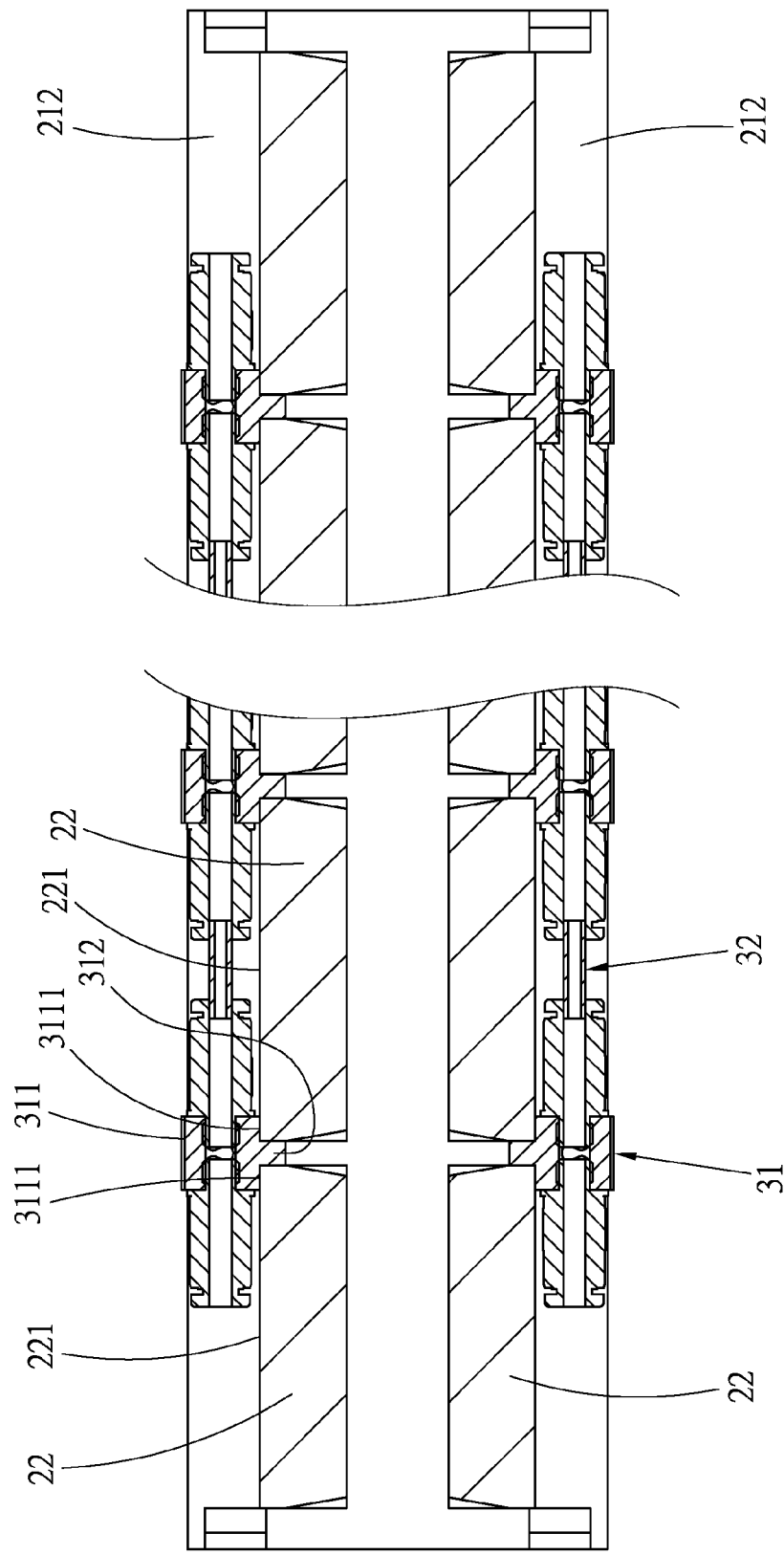
FIG. 5 is a sectional view taken along line 5-5 of FIG. 3.
Figure 6:
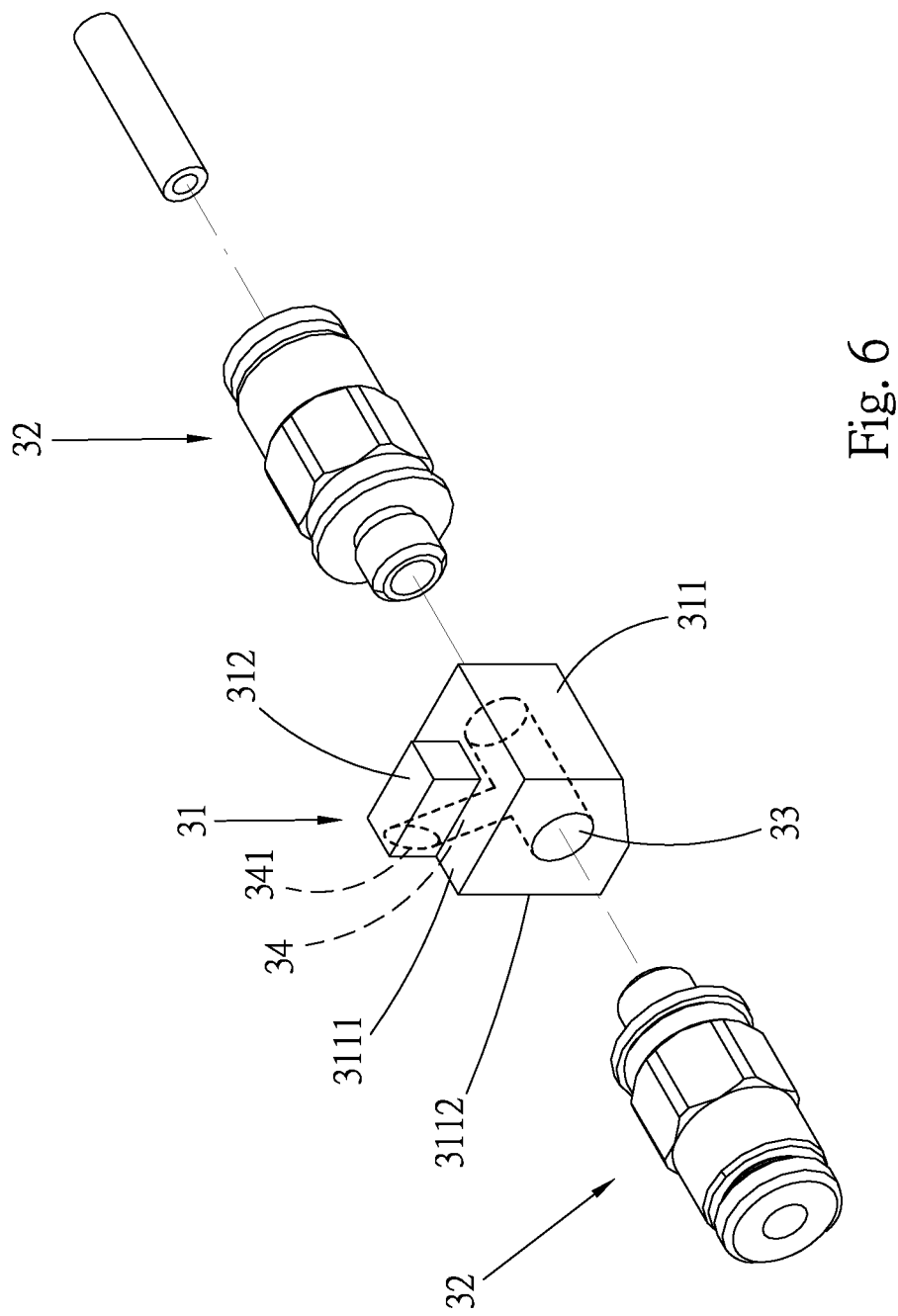
FIG. 6 is a perspective exploded view of a part of the preferred embodiment of the present invention.

Please refer to FIGS. 2 to 6. According to a preferred embodiment, the linear motor cooling mechanism 10 of the present invention includes two stators 20, a mover (not shown) and two cooling sections 30.

It should be first noted that the stators 20 and the mover pertain to well known prior art of conventional linear motor. Substantially, the permanent magnets of the stators 20 forma fixed magnetic field. After the windings of the mover are powered on, the mover creates a variable magnetic field. The fixed magnetic field and the variable magnetic field interact on each other to make the mover linearly reciprocally move. This technique is well known by those skilled in this field and thus will not be further described hereinafter.

The stators 20 are elongated members spaced from each other in parallel to each other. Each stator 20 has an elongated board-shaped bed section 21 and multiple magnetic sections 22 each of which is formed of a block-shaped permanent magnet. The magnetic sections 22 are sequentially arranged at equal intervals along the length of the bed section 21. First faces of the magnetic sections 22 are fixedly attached to a face 211 of the bed section 21. The faces 211 of the two bed sections 21 correspondingly face each other.

To speak more specifically, each magnetic section 22 has a trapezoidal shape. The bottom sides 221 of the magnetic sections 22 are respectively attached and connected to the two bed sections 21 in mirror-symmetry to each other. One end of the magnetic sections 22 outward protrudes from one side 212 of the corresponding bed section 21 along the length thereof.

The mover (not shown) is properly positioned between the two stators 20. Under the interaction between the magnetic fields of the stators and the mover, the mover is reciprocally movable along the length of the stators 20.

The cooling sections 30 are respectively lengthwise disposed on one side of the stators 20. Each cooling section 30 has multiple bypass heads 31 spaced from each other and multiple tubular connection members 32 bridged between the adjacent bypass heads 31 to serially connect the bypass heads 31 into an elongated member in parallel to the length of the stator 20. A main flow way 33 passes through the respective bypass heads 31 and connection members 32 and extends along the length of the elongated member composed of the serially connected bypass heads 31 and connection members 32. Multiple bypass flow ways 34 are respectively formed in the bypass heads 31 in communication with the main flow way 33.

To speak more specifically, the bypass heads 31 are positioned in positions where the gaps d between the adjacent magnetic sections 22 are positioned. Each bypass head 31 has a polygonal head body 311. The head body 311 has a first attachment plane face 3111 and a second attachment plane face 3112 normal to each other and adjacent to each other. The first and second attachment plane faces 3111, 3112 respectively attach to the side 212 of the bed section 21 and the bottom side 221 of the correspondingly magnetic section 22 in adjacency to the side 212. A protrusion block 312 outward protrudes from the head body 311 and extends into the corresponding gap d between two adjacent magnetic sections 22.

The main flow way 33 passes through a part of the head body 311 of the bypass head 31. The bypass flow way 34 extends from the head body 311 to the protrusion block 312 to form an air outlet 341 on a free end face of the protrusion block 312 in the gap d. The air outlet 341 is an oblique passage inward inclined to the face 211 of the corresponding bed section 21. Accordingly, the air flowing out from the air outlets 341 can flow toward the interior of the stators 20.

According to the linear motor cooling mechanism 10 of the present invention, a proper conventional pipe connector can be used to connect an external air source to the main flow way 33 so as to supply air into the main flow way 33. The air can be further distributed and guided into the gaps d through the respective bypass flow ways 34 to form continuously flowing airflow between the mover and the stators 20 for carrying away and dissipating the heat. In addition, the cooling section 30 is composed of multiple serially connected bypass heads 31 and connection members 32. Accordingly, the cooling section 30 can be more flexibly assembled with the linear motor. The number and position of the bypass heads 31 can be adjusted in accordance with practical requirement. Moreover, even the air outgoing direction of the air outlets 341 is adjustable to achieve the best heat dissipation and cooling effect and facilitate the assembling process. Accordingly, the manufacturing cost is lowered. Also, the cooling section 30 can be additionally assembled with a conventional linear motor as an optional device of the linear motor. In this case, the application range of the cooling section 30 is widened and popularized in comparison with the conventional technique.

The above embodiments are only used to illustrate the present invention, not intended to limit the scope thereof. Many modifications of the above embodiments can be made without departing from the spirit of the present invention.

What is claimed is:

1. A linear motor cooling mechanism comprising:
    at least one elongated stator having an elongated bed section and multiple magnetic sections sequentially arranged along a length of the bed section and fixedly disposed on the bed section;
    a mover positioned in adjacency to one side of the bed section, under the action of magnetic fields created by the adjacent magnetic sections, the mover being reciprocally movable along the length of the bed section; and
    at least one cooling section having at least one main flow way and multiple bypass flow ways in communication with the main flow way, whereby the air flowing within the main flow way can be distributed to the respective bypass flow ways to flow out from the bypass flow ways so as to form airflow between the stator and the mover, the linear motor cooling mechanism being characterized in that the cooling section has multiple bypass heads serially connected with each other, the bypass heads being fixedly disposed on one side of the stator along the length thereof, the main flow way extending along an axis of the serially connected bypass heads in communication with the bypass flow ways, each bypass flow way being formed in a corresponding bypass head in communication with the main flow way to form an air outlet on one side of the bypass head;
    wherein the magnetic sections are arranged on the bed section at equal intervals;
    wherein the bypass heads are positioned in positions where gaps between the adjacent magnetic sections are positioned;
    wherein each bypass head has a head body attached to one side of the bed section, a protrusion block protruding from one side of the head body and extending into the gap between two adjacent magnetic sections.

2. The linear motor cooling mechanism as claimed in claim 1, wherein one end of the magnetic sections protrudes from the side of the bed section and the head body attaches to the side of the bed section and one side of the correspondingly magnetic section in adjacency to the side of the bed section.

3. The linear motor cooling mechanism as claimed in claim 2, wherein the head body has a first attachment plane face and a second attachment plane face normal to each other and adjacent to each other, the first and second attachment plane faces respectively attaching to the side of the bed section and side of the correspondingly magnetic section in adjacency to the side of the bed section.

4. The linear motor cooling mechanism as claimed in claim 1, wherein the bypass flow way extends from the head body to the protrusion block to form the air outlet on a free end face of the protrusion block.

5. The linear motor cooling mechanism as claimed in claim 1, wherein the cooling section further has multiple tubular connection members bridged between the adjacent bypass heads to serially connect the bypass heads.

\* \* \* \* \*